United States Patent Office 3,480,697
Patented Nov. 25, 1969

3,480,697
PARA-THIOCARBAMOYLPHENYL PHOSPHOROTHIOATES
Bernard Miller, Princeton, and Howard Margulies, Princeton Junction, N.J., assignors to American Cyanamid Company, Stamford, Conn., a corporation of Maine
No Drawing. Filed Feb. 2, 1966, Ser. No. 524,496
Int. Cl. C07f 9/18, 9/24, 9/40
U.S. Cl. 260—944    4 Claims

ABSTRACT OF THE DISCLOSURE

A miticidal compound of the formula:

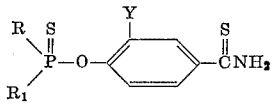

wherein R represents alkoxy having from 2–3 carbon atoms; $R_1$ is a substituent such as lower alkoxy, phenyl, chloro- or bromo-substituted (lower)alkoxy or di(lower alkyl)amino; and Y is hydrogen, chloro or bromo, said compound being prepared by reacting a p-hydroxythiobenzamide with a halothiophosphate.

---

This invention relates to a novel class of thiobenzamides, to a method for the preparation thereof and has as its principal object their use in compositions for controlling a variety of arachnids and insects. More particularly, the invention relates to a novel class of compounds of the formula:

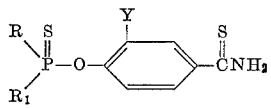

wherein R represents alkoxy or halo-substituted alkoxy, having from 2 to 4 carbon atoms; $R_1$ represents lower alkyl, lower alkoxy, phenyl, halo-substituted (lower)alkoxy, mono(lower alkyl)amino, di(lower alkyl)amino; and Y is hydrogen or halo-substituent, such as fluorine, chlorine, bromine or iodine.

Illustrative of the compounds contemplated are:

O-ethyl-O-methyl-O-p-thiocarbamoylphenylphosphorothioate,
O,O-diethyl-O-p-thiocarbamoylphenylphosphorothioate,
O-2-bromo-4-thiocarbamoylphenyl-O,O-diethylphosphorothioate,
O-2-chloro-4-thiocarbamoylphenyl-O,O-diethylphosphorothioate,
O,O-di-2-chloroethyl-O-p-thiocarbamoylphenylphosphorothioate,
O-ethyl-O-p-thiocarbamoylphenyl-N,N-dimethylphosphoramidothioate,
O-ethyl-O-p-thiocarbamoylphenylphenylphosphonothioate, and
O,O-diisopropyl-O-p-thiocarbamoylphenylphosphorothioate.

In general, the compounds of the invention are prepared in a straightforward manner by reacting in approximately equimolar amounts, a p-hydroxythiobenzamide with either a thiophosphoryl halide or a thiophosphonyl halide in the presence of a base. The reaction may be graphically illustrated as follows:

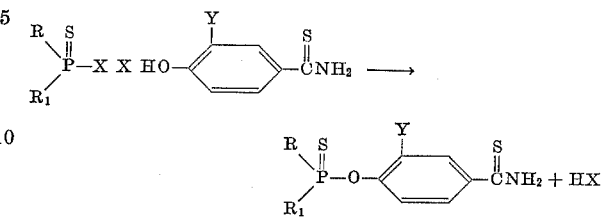

wherein R, $R_1$ and Y are as defined above and X is a halo-substituent, such as chloro or bromo.

The reaction may be carried out over a wide temperature range, as for instance, over the range of from about 0° C. to about 100° C., and in the presence of a variety of solvents, such as water; lower alcohols, such as ethanol or propanol; lower alkyl esters, such as ethyl acetate or butyl acetate; lower aliphatic ketones, such as methylisobutylketone, methylethylketone; glycols, such as ethylene glycol; as well as aromatic solvents, such as benzene. Although the reaction temperature and the solvent medium may be widely varied, the presence of a base is a prime requirement. A strong base will maximize the effectiveness of the reaction. Exemplary strong bases include: sodium methoxide, sodium hydroxide, potassium hydroxide, and potassium t-butoxide.

The compounds of the present invention may alternatively be obtained by the reaction between an O,O-dialkyl-p-carbamoylphenyl phosphorothioate and phosphorous pentasulfide in equimolar amounts. The reaction may be graphically shown as follows:

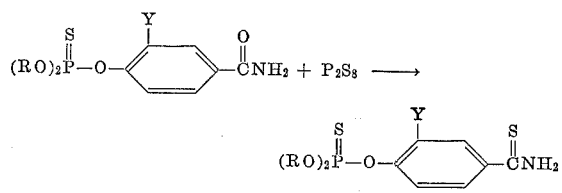

where R and Y are defined hereinabove. The reaction is advantageously carried out in inert solvents, such as benzene, toluene or chloroform.

The novel compounds above defined are unusually effective contact and systemic insecticides and arachnicides. It has also been noted that these novel compounds are exceedingly effective as a miticide against both the larvae and adult stages of the latter.

Application of the compounds of the invention for the purpose of pest control can be accomplished using conventional type formulations and equipment. The compounds may be formulated as wettable powders, dusts, dust concentrates, emulsifiable concentrates and the like which are amenable to application with conventional spraying or dusting apparatus.

Wettable powder formulations are generally prepared by admixing from about 25% to 95% by weight of active ingredient with finely ground clay, such as kaolin or attapulgite, either with or without a surface active agent, emulsifier or spreader-sticker. The latter is then dispersed in water for spray application.

Dusts and dust concentrates are similarly prepared using from about 5% to 85% of active ingredient and from about 95% to 5% of finely divided inert ingredients. These dusts are generally applied as such, or they may be further diluted with finely ground inert solids and then applied with conventional dusting apparatus.

Emulsifiable concentrates may be prepared by dissolving or dispersing the active ingredient in organic solvent, with or without emulsifying agents, surfactants or the like. Such formulations are then diluted with either water or an appropriate organic diluent prior to application.

The invention may be better understood by referring to the examples provided below which are to be taken as merely illustrative. Unless otherwise specified, parts are by weight.

EXAMPLE 1

Preparation of O-ethyl-O-methyl-O-p-thiocarbamoylphenyl phosphorothioate

To a solution of 0.3 mole of potassium t-butoxide and 0.3 mole p-hydroxythiobenzamide in 250 ml. of t-butanol is added 0.3 mole of O-methyl-O-ethyl chlorothiophosphate. The solution is allowed to stand for 15 minutes and then poured into water, extracted with methylene chloride, the extract dried and the solvent evaporated under vacuum. The solid obtained is recrystallized from a petroleum ether-benzene mixture of yield 0.4 gram (5.0%) yellow solid, melting point 70–72° C.

*Analysis.*—Calc'd. for $C_{10}H_{14}PNS_2O_3$: C, 41.2; H, 4.85; N, 4.81; P, 10.63. Found: C, 40.50; H, 4.75; N, 4.26; P, 10.58.

EXAMPLE 2

Preparation of O,O,-diethyl-O-p-thiocarbamoylphenyl phosphorothioate

A solution of 5.1 grams (0.033 mole) p-hydroxythiobenzamide, 6.25 grams (0.033 mole) O,O-diethyl chlorothiophosphate and 3.7 grams (0.033 mole) potassium t-butoxide in 300 ml. tert-butanol is stirred at room temperature overnight. The neutral solution is poured into water, extracted with methylene chloride, the extract dried over $MgSO_4$, and concentrated under vacuum to give a yellow solid. This is recrystallized from a benzene-petroleum ethyl mixture to give 4.8 grams (48%) (melting point 92° C.) yellow solid.

*Analysis.*—Calc'd. for $C_{11}H_{16}PNS_2O_3$: C, 43.3; H. 5.29; N, 4.59; S, 21.0; P. 10.16. Found: C, 43.11; H, 5.08; N, 4.41; S, 21.10; P, 10.21.

EXAMPLE 3

Preparation of O-2-bromo-4-thiocarbamoylphenyl-O,O-diethyl phosphorothioate

A solution of 0.13 mole of 3-bromo-4-hydroxythiobenzamide, 0.13 mole of potassium t-butoxide and 250 ml. of t-butanol is treated with 0.13 mole of O,O-diethyl chlorothiophosphate and permited to stand for 15 minutes. The solution is then poured into water, extracted with methylene chloride, dried and the solvent evaporated under vacuum. The resulting yellow solid is recrystallized from a benzene-n-hexane mixture of yield 0.9 gram (18%) of product, whose melting point is 71°–73° C.

EXAMPLE 4

Preparation of O-2-chloro-4-thiocarbamoylphenyl-O,O-diethyl phosphorothioate

A solution of 0.016 mole of potassium t-butoxide and 0.016 mole of 3-chloro-4-hydroxythiobenzamide in 250 ml. of t-butanol is treated with 0.016 mole of O,O-diethyl chlorothiophosphate and permitted to stand for 15 minutes. The solution is then poured into water, extracted with methylene chloride, the extract dried over magnesium sulfate and concentrated under vacuum. The residue obtained as a yellow oil weighing 3.0 grams is then washed with n-hexane and run through a column of "Florisil" brand magnesium silicate to give 1.4 grams (25%) of material having an index of refraction ($n_D{}^{25}$) equal to 1.6060.

*Analysis.*—Calc'd. for $C_{11}H_{15}PNS_2O_3Cl$: C, 38.9; H, 4.46; N, 4.13; S, 18.89; Cl, 10.43; P, 9.12. Found: C, 38.82; H, 4.47; N, 4.09; S, 18.82; Cl, 10.61; P, 8.93.

EXAMPLE 5

Preparation of O,O-bis(2-chloroethyl)-O-p-thiocarbamoylphenyl phosphorothioate

To a stirred solution of 250 ml. of t-butanol, 0.03 mole of p-hydroxythiobenzamide and 0.03 mole of potassium t-butoxide is added 0.03 mole of O,O,-di-2-chloroethyl phosphorochloridothioate. The mixture is allowed to stand for fifteen minutes, then admixed with water and extracted with methylene chloride. The methylene chloride phase is then dried and the solvent evaporated under vacuum to give the above product.

EXAMPLE 6

Preparation of O-ethyl-O-p-thiocarbamoylphenyl-N,N-dimethylphosphoramidothioate

A stirred solution of 250 ml. of t-butanol, 0.03 mole of p-hydroxythiobenzamide and 0.03 mole of potassium t-butoxide is treated with 0.03 mole of O-ethyl dimethylphosphoramidothioate. The mixture is permitted to stand for fifteen minutes, then poured into water, extracted with methylene chloride, the extract dried and concentrated under vacuum to give the above product.

EXAMPLE 7

Preparation of O-ethyl-O-p-thiocarbamoylphenyl-phenyl-phosphonothioate

To a stirred solution of 0.03 mole of potassium t-butoxide and 0.03 mole of p-hydroxythiobenzamide in 250 ml. of t-butanol is added 0.03 mole of O-ethyl phenyl chlorothiophosphorate. After standing for 15 minutes the solution is extracted with methylene chloride and the product run through a small column of magnesium silicate to yield a 3.7 gram fraction which solidified. This is recrystallized from a chloroform-n-hexane mixture to yield 1.5 grams of yellow solid having a melting point of 97–107° C.

*Analysis.*—Calc'd. for $C_{15}H_{16}PNS_2O_3$: C, 53.4; H, 4.78; N, 4.16; S, 19.00; P, 9.18. Found: C, 53.21; H, 5.10; N, 4.16; S, 19.10; P, 9.21.

EXAMPLE 8

Preparation of O,O-diisopropyl O-p-thiocarbamoylphenyl phosphorothioate

To a stirred solution of 3.65 grams (0.033 mole) of potassium t-butoxide in 150 ml. t-butanol at room temperature is added 5.0 grams (0.033 mole) of p-hydroxythiobenzamide. After 15 minutes, 7.1 grams (0.033 mole) O,O-diisopropyl chlorothiophosphate is added and the mixture is refluxed for 6 hours and left standing overnight. The neutral solution is then poured into water, extracted with methylene chloride, the extract dried over magnesium sulfate and concentrated under vacuum to give 10 grams of viscous red oil which solidifies upon standing. Recrystallization from a benzene-n-hexane mixture gives 5.7 grams (54%) of yellow solid, melting point 112–114° C.

*Analysis.*—Calc'd. for $C_{13}H_{20}PNS_2O_3$: C, 46.9; H, 6.04; N, 4.21; S, 19.25; P, 9.31. Found: C, 46.84; H, 6.08; N, 4.11; S, 19.48; P, 9.10.

Similarly, the O,O-di-n-butyl O-p-thiocarbamoylphenyl phosphorothioate is prepared by substituting for the O,O-diisopropyl chlorothiophosphate, O,O-di-n-butyl chlorothiophosphate and repeating the procedure of Example 8 above.

EXAMPLE 9

Preparation of O,O-diethyl O-p-thiocarbamoylphenyl phosphorothioate 3.5 grams of O,O-diethyl-p-carbamoylphenyl phosphorothioate is added to a vigorously stirred suspension of phosphorus pentasulfide (0.54 gram) in 100 ml. benzene. The mixture is refluxed for 15 minutes, poured into cold water, and the benzene layer dried over magnesium sulfate. Filtration and evaporation of the solvent left 3.6 grams of yellow solid. Recrystallization from benzene-hexane gives 1.4 grams (38%) of solid, melting point 89–90° C., identical in IR spectrum with the product of Example 1.

The following examples are included to illustrate the preparation of novel thiobenzamide reactants.

EXAMPLE 10

Preparation of p-hydroxythiobenzamide

To a saturated solution of hydrogen bromide in 350 ml. of dimethyl formamide is added 100 g. of p-hydroxybenzonitrile and 126 g. of thioacetamide. This mixture is heated on a steam bath at 100° C. for 15 minutes and then the dimethyl formamide distilled off at 15–20 mm. and 88–98° C. When distillation is complete, the acidic solution is neutralized with one liter of dilute sodium bicarbonate and the hot solution is filtered and the filtrate permitted to cool. On cooling the solid precipitates, is separated from the solution and recrystallized from 1500 ml. of water, then dried under vacuum, recovered and identified above and has a melting point of 197–199° C.

EXAMPLE 11

Preparation of 3-bromo-4-hydroxythiobenzamide

A solution of acetic acid containing 0.3 mole of p-hydroxybenzonitrile and 0.5 mole of sodium acetate is treated with 0.3 mole of bromine to yield a mixture of 3-bromo-4-hydroxybenzonitrile and 2,3-dibromo-4-hydroxybenzonitrile. The mixed product is recrystallized from iso-propanol, then treated with water and recrystallized again from benzene to yield the monobrominated product having a melting point of 152–154° C. The 3-bromo-4-hydroxybenzonitrile is then mixed with 80 g. of pyridine and 20 g. of triethylamine. Hydrogen sulfide gas is bubbled into this mixture and the mixture poured into water. This is acidified with aqueous hydrogen chloride, extracted with ethyl acetate and the extract dried over magnesium sulfate. After concentration of the residue, the yellow solid obtained is treated with toluene and recovered therefrom. This product has a melting point of 169–171° C.

In repeating the above procedure, the corresponding 3-chloro- or 3-iodo-4-hydroxythiobenzamide can be prepared readily by substituting either chlorine or iodine for the bromine.

The following examples illustrate the utility of the phenylthioamides of the present invention.

EXAMPLE 12

Contact miticidal activity of the compounds of the instant invention is compared with a lower homologue, namely, O,O-dimethyl O-p-thiocarbamoylphenyl phosphorothioate by employing the following procedure: Sieva lima bean plants are infested about five hours before testing using about 200 adult mites per leaf. The infested leaves are dipped in test solutions made up in .01% concentration of active compound or ingredient in 65% acetone and 35% water. After the leaves of the plants are dipped, they are placed in a hood to dry and when dry held for two days in a constant temperature and humidity room at 80° F., 60% R.H. Following the two-day holding period, the adult mite mortality count is determined by examining the plants under a 10× binocularscope.

Summarized results of the tests are provided in Table I following the examples.

EXAMPLE 13

Systemic miticidal activity of the compounds of the invention is demonstrated by the following tests in which the activity of the O,O-dimethyl O-p-thiocarbamoylphenyl phosphorothioate, a lower homolog, is compared with the activity of the novel substituted, tabularized analogs. In the tests, the individual compounds are prepared as 100 p.p.m. emulsions in acetone and water. These test emulsions are placed in separate 2-ounce bottles. Sieva lima bear plants, cut off just above soil level, are then inserted in the bottles containing the test solutions. The bottles are arranged in ventilated boxes with the leaves extending outside of the boxes to assure that the fumes from the compounds are drawn out through the boxes rather than rising to effect the test plants. About 50 adult mites are placed on one leaf of each plant and permitted to remain therefor three days. Following the holding period, the leaves are examined and the mortality counts made.

The systemic activity of the compounds is summarized as shown in Table I below.

TABLE I

| Structure of test compound | Contact, percent kill 0.01% | Systemic, percent kill 0.01% |
|---|---|---|
| $(CH_3O)_2$-P(=S)-O-C$_6$H$_4$-C(=S)NH$_2$ | 0 | 0 |
| $(C_2H_5O)_2$-P(=S)-O-C$_6$H$_3$(Br)-C(=S)NH$_2$ | 100 | 29 |
| $(C_2H_5O)_2$-P(=S)-O-C$_6$H$_3$(Cl)-C(=S)NH$_2$ | 100 | 90 |
| $(C_2H_5O)_2$-P(=S)-O-C$_6$H$_4$-C(=S)NH$_2$ | 100 | 90 |
| $CH_3O(C_2H_5O)$P(=S)-O-C$_6$H$_4$-C(=S)NH$_2$ | 100 | 81 |
| $C_2H_5O(C_6H_5)$P(=S)-O-C$_6$H$_4$-C(=S)NH$_2$ | 73 | 98 |

We claim:

1. A miticidal compond of the formula:

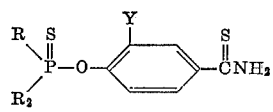

wherein R represents alkoxy having from 2 to 3 carbon atoms; $R_1$ represents a lower alkoxy from 1 to 3 carbon atoms, phenyl, chloro- or bromo-substituted (lower) alkoxy of from 1 to 3 carbon atoms or di(lower alkyl)-amino; and Y is hydrogen, chloro or bromo.

2. The compound according to claim 1: O-ethyl O-methyl O-p-thiocarbamoylphenyl phosphorothioate.

3. The compound according to claim 1: O,O-diethyl O-p-thiocarbamoylphenyl phosphorothioate.

4. The compound according to claim 1: O-2-bromo-4-thiocarbamoylphenyl O,O-diethyl phosphorothioate.

References Cited

UNITED STATES PATENTS 2,520,393  8/1950  Fletcher _____ 260—973 XR

FOREIGN PATENTS 1,129,484  5/1962  Germany.

CHARLES B. PARKER, Primary Examiner

ANTON H. SUTTO, Assistant Examiner

U.S. Cl. X.R.

424—211; 260—973, 943

UNITED STATES PATENT OFFICE
CERTIFICATE OF CORRECTION

Patent No. 3,480,697                                November 25, 1969

Bernard Miller et al.

It is certified that error appears in the above identified patent and that said Letters Patent are hereby corrected as shown below:

Column 2, lines 5 to 10, the formula should appear as shown below:

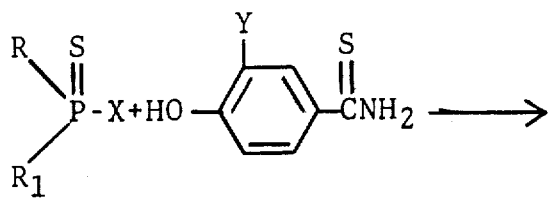

same column 2, lines 36 to 40, the formula should appear as shown below:

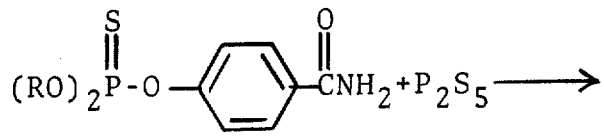

Column 3, line 30, "of" should read -- to --; line 60, "permited" should read -- permitted --; line 64, "of" should read -- to --. Column 4, line 45, "chlorothiophosphorate" should read -- chlorothiophosphonate --; line 52, "Calc'd. for $C_{15}H_{16}PNS_2O_3$" should read -- Calc'd. for $C_{15}H_{16}PNS_2O_2$ --. Column 6, line 18, "bear" should read -- bean --; line 23, "effect" should read -- affect --; line 25, "therefor" should read -- there for --.

Signed and sealed this 20th day of October 1970.

(SEAL)
Attest:

EDWARD M. FLETCHER, JR.                         WILLIAM E. SCHUYLER, JR.
Attesting Officer                               Commissioner of Patents